United States Patent
Kato

(10) Patent No.: US 11,932,823 B2
(45) Date of Patent: Mar. 19, 2024

(54) LUBRICANT COMPOSITION FOR SHOCK ABSORBERS, ADDITIVE FOR FRICTION ADJUSTMENT, LUBRICANT ADDITIVE, SHOCK ABSORBER AND FRICTION ADJUSTMENT METHOD FOR LUBRICANT COMPOSITION FOR SHOCK ABSORBERS

(71) Applicant: KYB Corporation, Tokyo (JP)

(72) Inventor: Shinji Kato, Tokyo (JP)

(73) Assignee: KYB CORPORATION, Tokyo (JP)

( * ) Notice: Subject to any disclaimer, the term of this patent is extended or adjusted under 35 U.S.C. 154(b) by 24 days.

(21) Appl. No.: 17/601,828

(22) PCT Filed: Apr. 10, 2020

(86) PCT No.: PCT/JP2020/016063
§ 371 (c)(1),
(2) Date: Oct. 6, 2021

(87) PCT Pub. No.: WO2020/218025
PCT Pub. Date: Oct. 29, 2020

(65) Prior Publication Data
US 2022/0204882 A1    Jun. 30, 2022

(30) Foreign Application Priority Data

Apr. 26, 2019 (JP) ................................. 2019-085919
Oct. 11, 2019 (JP) ................................. 2019-187393

(51) Int. Cl.
*C10M 137/10* (2006.01)
*C07F 9/165* (2006.01)
(Continued)

(52) U.S. Cl.
CPC ......... *C10M 137/10* (2013.01); *C07F 9/1658* (2013.01); *C10M 169/04* (2013.01);
(Continued)

(58) Field of Classification Search
CPC .............. C10M 137/10; C10M 169/04; C10M 2203/003; C10M 2223/045;
(Continued)

(56) References Cited

U.S. PATENT DOCUMENTS

| | | | | |
|---|---|---|---|---|
| 5,198,129 A | * | 3/1993 | Hata | ................... C10M 163/00 508/378 |
| 2009/0105103 A1 | * | 4/2009 | Hashida | ............... C10M 169/04 508/555 |

(Continued)

FOREIGN PATENT DOCUMENTS

| | | |
|---|---|---|
| EP | 0 604 218 A1 | 6/1994 |
| JP | 6-145684 A | 5/1994 |

(Continued)

OTHER PUBLICATIONS

International Search Report dated Jul. 21, 2020, issued in counterpart International Application No. PCT/JP2020/016063. (2 pages).
(Continued)

*Primary Examiner* — Prem C Singh
*Assistant Examiner* — Francis C Campanell
(74) *Attorney, Agent, or Firm* — WHDA, LLP

(57) ABSTRACT

To provide a lubricant composition for shock absorbers, a friction adjusting additive for a lubricant for shock absorbers, and a lubricant additive, each capable of satisfying both operational stability and ride comfort and improving the ride comfort further. The lubricant composition for shock absorbers contains a base oil and a friction adjusting agent and the friction adjusting agent contains a first zinc dithiophosphate represented by the following formula 1:

(Continued)

[in the formula 1, $R^{11}$ to $R^{14}$ are alkyl groups in which one or more and three or less is/are a primary alkyl group and the other(s) is/are a secondary alkyl group].

10 Claims, 3 Drawing Sheets

(51) Int. Cl.
*C10M 169/04* (2006.01)
*F16F 9/32* (2006.01)
*C10N 40/08* (2006.01)

(52) U.S. Cl.
CPC ........ *F16F 9/3278* (2013.01); *B60G 2202/24* (2013.01); *B60G 2206/70* (2013.01); *C10M 2203/003* (2013.01); *C10M 2223/045* (2013.01); *C10N 2040/08* (2013.01); *F16F 2222/12* (2013.01); *F16F 2224/04* (2013.01); *F16F 2230/04* (2013.01)

(58) Field of Classification Search
CPC ... C10M 2207/283; C07F 9/1658; C07F 9/17; F16F 9/3278; F16F 2222/12; F16F 2224/04; F16F 2230/04; B60G 2202/24; B60G 2206/70; C10N 2040/08; C10N 2030/06
USPC ........................................................ 508/371
See application file for complete search history.

(56) References Cited

U.S. PATENT DOCUMENTS

| 2014/0342956 | A1* | 11/2014 | Hanyuda .............. C10M 141/10 |
| | | | 508/279 |
| 2015/0038384 | A1 | 2/2015 | Sakanoue |
| 2015/0322369 | A1* | 11/2015 | Patel .................... C10M 129/68 |
| | | | 508/192 |
| 2016/0194576 | A1 | 7/2016 | Sakanoue et al. |
| 2016/0369200 | A1 | 12/2016 | Sakanoue |

FOREIGN PATENT DOCUMENTS

| JP | 6-220477 A | 8/1994 |
| JP | 2003-41283 A | 2/2003 |
| JP | 2010-121063 A | 6/2010 |
| JP | 2019-19170 A | 2/2019 |
| JP | 2019-85524 A | 6/2019 |
| WO | 2013/141235 A1 | 9/2013 |
| WO | 2015/025972 A1 | 2/2015 |
| WO | 2015/025977 A1 | 2/2015 |

OTHER PUBLICATIONS

Notice of Reasons for Refusal dated Nov. 24, 2021, issued in counterpart of Japanese Patent Application No. 2020-543953, with concise explanation of relevance. (7 pages).
Nakanishi., "Technical Trends and Tribology of Shock Absorber", Tribologist, (2009), vol. 54, No. 9, pp. 598-603, with Partial Translation. (Cited in Specification). (8 pages).

* cited by examiner

[Fig.1]
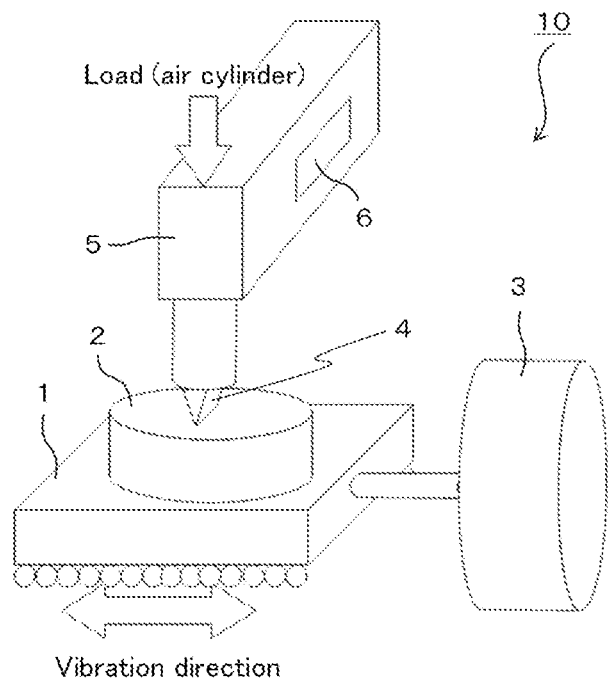
[Fig.2]
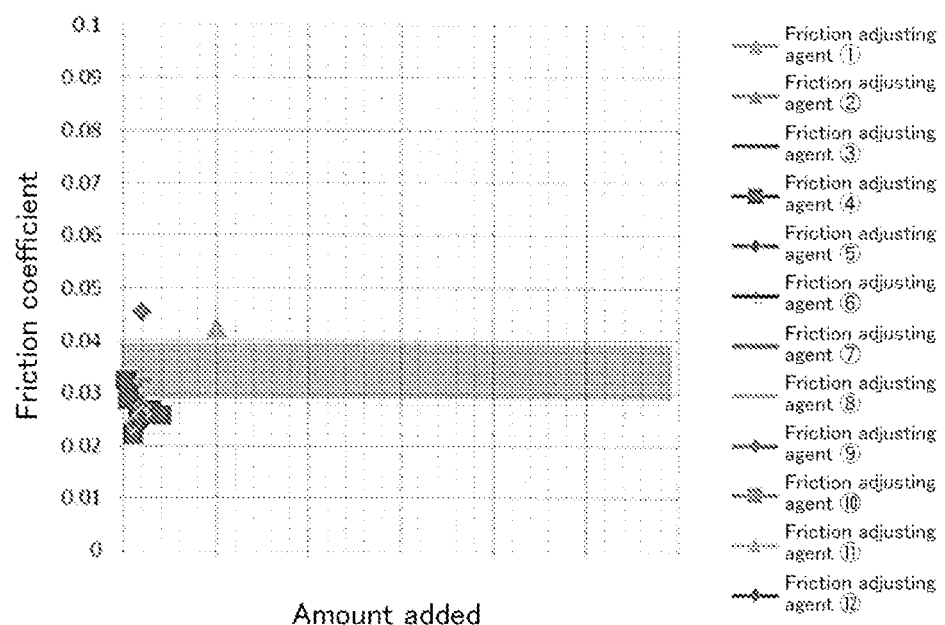

[Fig.3]
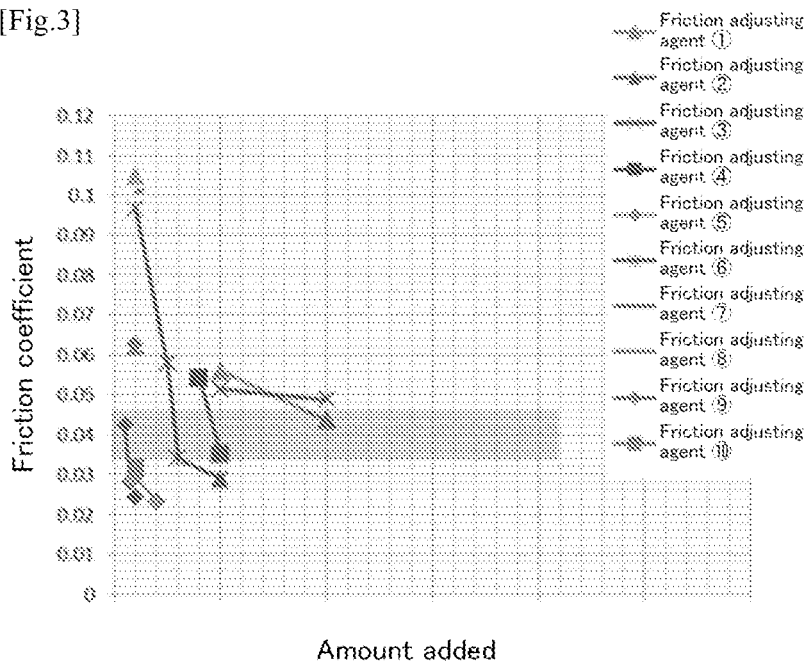
[Fig.4]
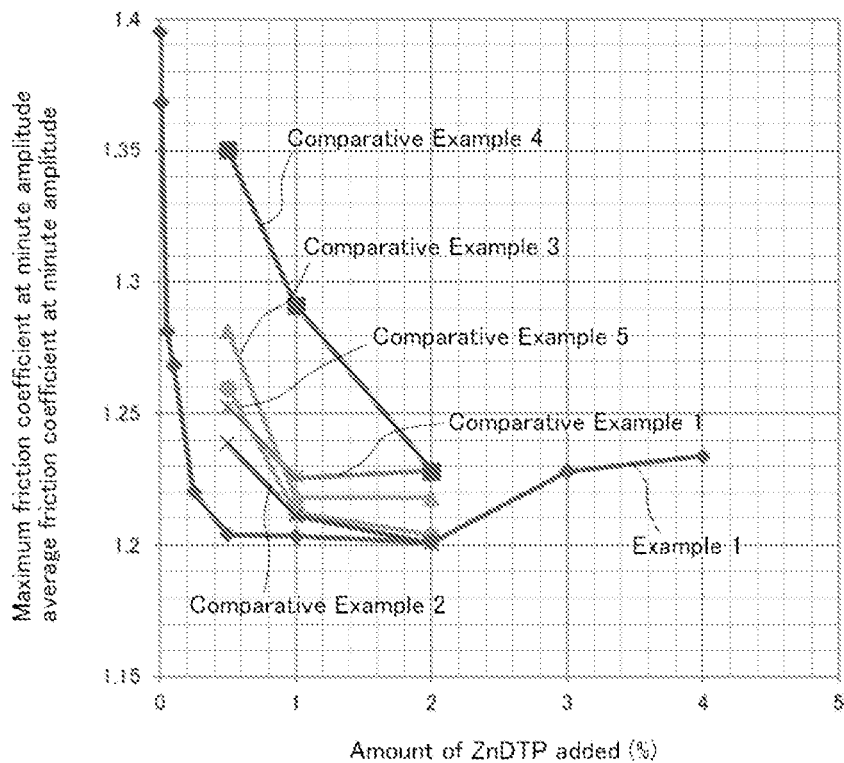

[Fig.5]
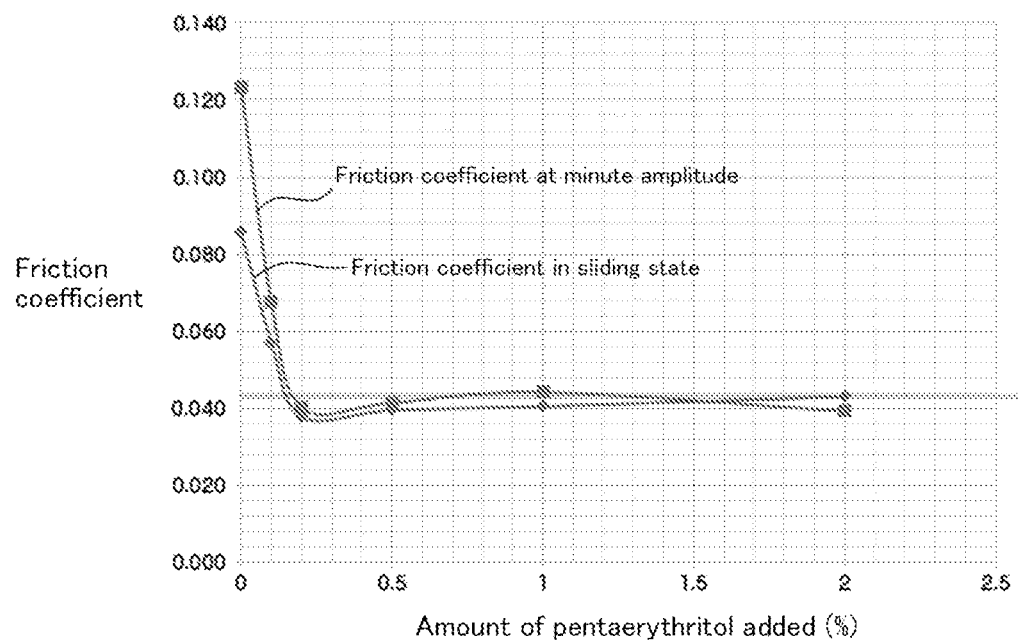

LUBRICANT COMPOSITION FOR SHOCK ABSORBERS, ADDITIVE FOR FRICTION ADJUSTMENT, LUBRICANT ADDITIVE, SHOCK ABSORBER AND FRICTION ADJUSTMENT METHOD FOR LUBRICANT COMPOSITION FOR SHOCK ABSORBERS

TECHNICAL FIELD

The present invention relates to a lubricant composition for shock absorbers, an additive for friction adjustment, a lubricant additive, a shock absorber, and a method of adjusting the friction of a lubricant for shock absorbers.

BACKGROUND ART

It is conventionally known that the vibration damping force of a shock absorber is the sum of a hydraulic damping force generated at a valve and a friction force generated at a sliding part between a piston rod and an oil seal or between a piston and a cylinder. It is also known that when the vibration damping force of a shock absorber is large, operational stability increases but ride comfort worsens; conversely, when the vibration damping force of a shock absorber is small, operational stability worsens but ride comfort gets better. In recent years, therefore, studies have been made focusing on ride comfort to decrease the friction force of a lubricant for shock absorbers by adjusting a friction adjusting agent to be added to a lubricant for shock absorbers (for example, Non-Patent Document 1).

PRIOR ART DOCUMENT

Non-Patent Document

Non-Patent Document 1: Technical Trends and Tribology of Shock Absorber (Hiroshi Nakanishi, Tribologist, 2009 (Vol. 54), No. 9, page 598)

SUMMARY

Technical Problem

Shock absorbers exhibit their vibrating damping force by reciprocating motion. It takes a certain amount of time for their hydraulic damping force to start up, while a friction force is highly responsive so that at the time of transition from a stationary state to a sliding state or at the time of a minute amplitude, the friction force becomes an important factor of the vibration damping force of shock absorbers. No attention has conventionally been paid to a difference in friction characteristics between at the time of transition from a stationary state to a sliding state or a minute amplitude and at the time of a sliding state or a normal amplitude. Conventional lubricants for shock absorbers therefore have such a problem that a difference in friction force occurs between at the time of transition from a stationary state to a sliding state or a minute amplitude and at the time of a sliding state or a normal amplitude, causing a deterioration in ride comfort. In addition, a friction coefficient tends to vary at the time of transition from a stationary state to a sliding state or at the time of a minute amplitude and this also leads to a deterioration in ride comfort.

An object of the present invention is to provide a lubricant composition for shock absorbers, an additive for friction adjustment, a lubricant additive, a shock absorber, and a method of adjusting the friction of a lubricant for shock absorbers, each capable of satisfying both operational stability and ride comfort and further improving this ride comfort.

Solution to Problem

The aspect of the present invention is a lubricant composition for shock absorbers according to the following (1) to (5).

(1) A lubricant composition for shock absorbers, containing a base oil and a friction adjusting agent, wherein the friction adjusting agent contains a first zinc dithiophosphate represented by the following formula 1:

[Chemical formula 1]

$$R^{11}O\!-\!\underset{R^{12}O}{\overset{S}{\underset{\|}{P}}}\!-\!S\!-\!Zn\!-\!S\!-\!\underset{OR^{14}}{\overset{S}{\underset{\|}{P}}}\!-\!OR^{13} \quad (1)$$

[in the formula 1, $R^{11}$ to $R^{14}$ are alkyl groups in which one or more and three or less is/are a primary alkyl group and the other(s) is/are a secondary alkyl group].

(2) The lubricant composition for shock absorbers according to the aspect (1), further containing a second zinc dithiophosphate represented by the following formula 2:

[Chemical formula 2]

$$R^{21}O\!-\!\underset{R^{22}O}{\overset{S}{\underset{\|}{P}}}\!-\!S\!-\!Zn\!-\!S\!-\!\underset{OR^{24}}{\overset{S}{\underset{\|}{P}}}\!-\!OR^{23} \quad (2)$$

[in the formula 2, $R^{21}$ to $R^{24}$ are each a secondary alkyl group].

(3) The lubricant composition for shock absorbers according to the aspect (1) or (2), wherein the primary alkyl group which the first zinc dithiophosphate has is an alkyl group having 4 to 12 carbon atoms.

(4) The lubricant composition for shock absorbers according to any one of the aspects (1) to (3), wherein the secondary alkyl group which the first zinc dithiophosphate has is an alkyl group having 3 to 6 carbon atoms.

(5) The lubricant composition for shock absorbers according to any one of the aspects (1) to (4), which contains the first zinc dithiophosphate in an amount of 2 mass % or less.

(6) The lubricant composition for shock absorbers according to any one of the aspects (1) to (5), which contains the first zinc dithiophosphate in an amount of 0.25 mass % or more.

Another aspect of the present invention is an additive for friction adjustment for a lubricant for shock absorbers according to the following (7).

(7) A friction adjusting agent for a lubricant for shock absorbers, containing a first zinc dithiophosphate represented by the following formula 1:

[Chemical formula 3]

$$R^{11}O\!-\!\underset{R^{12}O}{\overset{S}{\underset{\|}{P}}}\!-\!S\!-\!Zn\!-\!S\!-\!\underset{OR^{14}}{\overset{S}{\underset{\|}{P}}}\!-\!OR^{13} \quad (1)$$

[in the formula 1, $R^{11}$ to $R^{14}$ are alkyl groups in which one or more and three or less is/are a primary alkyl group and the other(s) is/are a secondary alkyl group].

A further aspect of the present invention is a lubricant additive according to the following (8).

(8) A lubricant additive, containing a first zinc dithiophosphate represented by the following formula 1:

[Chemical formula 4]

$$\begin{array}{c} R^{11}O \\ R^{12}O \end{array} P \begin{array}{c} S \\ S \end{array} Zn \begin{array}{c} S \\ S \end{array} P \begin{array}{c} OR^{13} \\ OR^{14} \end{array} \quad (1)$$

[in the formula 1, $R^{11}$ to $R^{14}$ are alkyl groups in which one or more and three or less is/are a primary alkyl group and the other(s) is/are a secondary alkyl group].

A still further aspect of the present invention is a shock absorber according to the following (9).

(9) A shock absorber using the lubricant composition for shock absorbers according to any one of the aspects (1) to (6).

A still further aspect of the present invention is a method of adjusting the friction of a lubricant for shock absorbers according to the following (10) or (11).

(10) A method of adjusting the friction of a lubricant for shock absorbers, including adding, to a lubricant composition for shock absorbers containing a base oil and a friction adjusting agent, a first zinc dithiophosphate represented by the following formula 1 as the friction adjusting agent:

[Chemical formula 5]

$$\begin{array}{c} R^{11}O \\ R^{12}O \end{array} P \begin{array}{c} S \\ S \end{array} Zn \begin{array}{c} S \\ S \end{array} P \begin{array}{c} OR^{13} \\ OR^{14} \end{array} \quad (1)$$

[in the formula 1, $R^{11}$ to $R^{14}$ are alkyl groups in which one or more and three or less is/are a primary alkyl group and the other(s) is/are a secondary alkyl group].

(11) The method of adjusting the friction of a lubricant for shock absorbers according to the aspect (10), including adding a second zinc dithiophosphate represented by the following formula 2 further as the friction adjusting agent:

[Chemical formula 6]

$$\begin{array}{c} R^{21}O \\ R^{22}O \end{array} P \begin{array}{c} S \\ S \end{array} Zn \begin{array}{c} S \\ S \end{array} P \begin{array}{c} OR^{23} \\ OR^{24} \end{array} \quad (2)$$

[in the formula 2, $R^{21}$ to $R^{24}$ are each a secondary alkyl group].

Advantageous Effects of Invention

The present invention can provide a lubricant composition for shock absorbers, a friction adjusting agent for a lubricant for shock absorbers, and a lubricant additive capable of satisfying both operational stability and ride comfort and improving this ride comfort further.

BRIEF DESCRIPTION OF DRAWINGS

FIG. 1 shows one example of a friction tester used in present Example.

FIG. 2 is a graph showing the relation between the friction coefficient of a ZnDTP-free lubricant for shock absorbers and an amount of various friction adjusting agents added.

FIG. 3 is a graph showing the relation between the friction coefficient of a ZnDTP-containing lubricant for shock absorbers and an amount of various friction adjusting agents added.

FIG. 4 is a graph showing the friction characteristics of a lubricant for shock absorbers, depending on the kind of ZnDTPs.

FIG. 5 is a graph showing the relation between the friction coefficient of a ZnDTP-containing lubricant for shock absorbers and an amount of pentaerythritol added.

DESCRIPTION OF EMBODIMENTS

The lubricant composition for shock absorbers, additive for friction adjustment of shock absorbers, and lubricant additive according to the present invention will hereinafter be described based on some drawings. It is to be noted that in the following embodiment, a lubricant for shock absorbers will be exemplified as the embodiment of the lubricant composition for shock absorbers, additive for friction adjustment of shock absorbers, and lubricant additive according to the present invention.

The lubricant for shock absorbers according to the present embodiment has (A) a base oil and (B) a friction adjusting agent. The friction adjusting agent (B) contains at least (C) a zinc dithiophosphate (which may hereinafter be called "ZnDTP").

(A) Base Oil

The base oil in the lubricant for shock absorbers in the present embodiment is a mineral oil and/or a synthetic oil. The kind of the mineral oil or synthetic oil is not particularly limited. Examples of the mineral oil include paraffinic mineral oils, intermediate-based mineral oils, and naphthenic mineral oils obtained by a conventional refining method such as solvent refining or hydrotreating. Examples of the synthetic oil include polybutenes, polyolefins [α-olefin (co)polymers], various esters (such as polyol esters, dibasic acid esters, and phosphoric acid esters), various ethers (such as polyphenyl ether), alkylbenzenes, and alkylnaphthalenes. In the present invention, as the base oil, the above-described mineral oils may be used alone or in combination of two or more; the above-described synthetic oils may be used alone or in combination of two or more; or one or more of the mineral oils may be used in combination with one or more of the synthetic oils.

(B) Friction Adjusting Agent

The lubricant for shock absorbers according to the present invention contains a friction adjusting agent. Although the friction adjusting agent is not particularly limited, it may contain an anti-friction agent such as phosphorus-, amine-, or ester-based one. The friction coefficient of the lubricant for shock absorbers can be adjusted by adjusting an amount of the anti-friction agent added. The friction adjusting agent according to the present embodiment contains at least (C) zinc dithiophosphate as described below.

(C) Zinc Dithiophosphate (ZnDTP)

A ZnDTP is typically represented by the following chemical formula 7 and it has a function of assisting the friction adjusting agent to adjust the friction coefficient.

[Chemical formula 7]

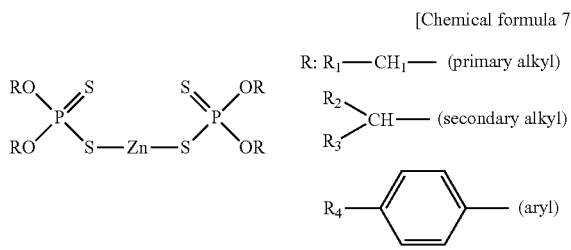

[in the chemical formula 7, Rs are each independently a hydrocarbon group and examples include linear primary alkyl groups, branched secondary alkyl groups, and aryl groups].

Although a plurality of kinds (structures) of ZnDTPs such as that having a primary alkyl group, that having a secondary alkyl group, and that having an aryl group are known, the lubricant for shock absorbers according to the present embodiment contains two kinds of ZnDTP as described below.

Described specifically, the lubricant for shock absorbers according to the present embodiment contains a ZnDTP represented by the following formula 1 as a first ZnDTP:

[Chemical formula 8]

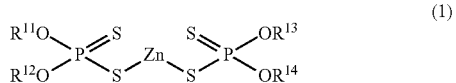

(1)

[in the formula 1, $R^{11}$ to $R^{14}$ are alkyl groups and these alkyl groups have a primary alkyl group and a secondary alkyl group. This means that one or more and three or less of $R^{11}$ to $R^{14}$ is/are a primary alkyl group and the other(s) of $R^{11}$ to $R^{14}$ is/are a secondary alkyl group].

The primary alkyl group of the first ZnDTP is not particularly limited and examples include methyl, ethyl, n-propyl, n-butyl, n-pentyl, n-hexyl, n-heptyl, n-octyl, n-nonyl, n-decyl, isoamyl, isobutyl, 2-methylbutyl, 2-ethylhexyl, 2,3-dimethylbutyl, and 2-methylpentyl groups. The primary alkyl group is preferably an alkyl group having from 4 to 12 carbon atoms (such as isobutyl group (having 4 carbon atoms) and 2-ethylhexyl group (having 8 carbon atoms)).

The secondary alkyl group of the first ZnDTP is not particularly limited and examples include isopropyl, sec-butyl, 1-ethylpropyl, and 4-methyl-2-pentyl groups. The secondary alkyl group is preferably an alkyl group having 3 to 6 carbon atoms (such as isopropyl group (having 3 carbon atoms)).

Although a ratio of the first alkyl group and the secondary alkyl group in the first ZnDTP is not particularly limited, a ratio of the primary alkyl group is preferably higher than a ratio of the secondary alkyl group.

Although the content of the first ZnDTP is not particularly limited, the content of it in the lubricant for shock absorbers is preferably 0.1 wt % or more, more preferably 0.25 wt % or more. In addition, the content of the first ZnDTP in the lubricant for shock absorbers is preferably 4.0 wt % or less, more preferably 2.0 wt % or less.

The lubricant for shock absorbers according to the present embodiment has, as a friction adjusting agent, a second ZnDTP having a structure different from that of the first ZnDTP. The second ZnDTP is represented by the following formula 2:

[Chemical formula 9]

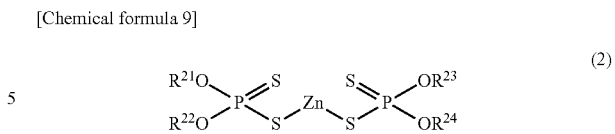

(2)

[in the formula 2, $R^{21}$ to $R^{24}$ are each a secondary alkyl group. This means that the second ZnDTP does not have a primary alkyl group but has only a secondary alkyl group].

The number of carbon atoms of the secondary alkyl group which the second ZnDTP has is not particularly limited and examples of the secondary alkyl group include isopropyl, sec-butyl, 1-ethylpropyl, 2-ethylhexyl, and 4-methyl-2-pentyl groups. The secondary alkyl group is preferably an alkyl group having 3 to 8 carbon atoms (for example, an isopropyl group (having 3 carbon atoms), a 2-ethylhexyl group (having 8 carbon atoms), or an isobutyl group (having 4 carbon atoms)).

Although the content of the second ZnDTP is not particularly limited, it is preferably smaller than that of the first ZnDTP. It is preferably 20 wt % or less of the amount of ZnDTPs added (a total amount of the first ZnDTP and the second ZnDTP).

What kind of alkyl group the ZnDTP contains can be determined by a known measurement method. For example, the structure of the ZnDTP can be determined using $C^{13}$-NMR or the structure of the ZnDTP can be determined by analyzing whether the alkyl group is a primary alkyl group or a secondary alkyl group based on the characteristics of P—O—C absorption bands or P=S and P—S absorption bands by using the fingerprint region of FT-IR.

EXAMPLES

Next, Example of the lubricant for shock absorbers according to the present embodiment will be described.

[Friction Tester 10]

FIG. 1 is a block diagram of a friction tester 10 used in the friction test in the present Example. The friction tester 10 is a pin-on-disk friction tester and it reciprocates a disk specimen 2 fixed on a slide bearing 1 by an electromagnetic exciter 3 and measures the friction force, which has been generated by sliding the disk specimen 2 while pressing a pin specimen 4 against it, by using a strain gauge 6 attached to a fixing shaft 5 of the pin specimen 4. Since a combination of a lubricant for shock absorbers and an oil seal serves as the factor that affects the friction characteristics of shock absorbers, an acrylonitrile butadiene rubber (NBR) to be used as an oil seal in a shock absorber is used as the pin specimen 4 and the pin specimen 4 is cut at the tip thereof so that it would have an angle of 140° to resemble an oil lip in the friction tester 10 shown in FIG. 1. The disk specimen 2 is coated with a hard chrome plating film which is also applied to the surface of a piston rod. The surface roughness Ra of the disk specimen 2 is adjusted to 0.01 μm or less by abrasive finishing. In the present Example, the friction force (friction coefficient) between the NBR pin specimen 4 and the chrome-plated disk specimen 2 is measured, but the friction force (friction coefficient) between a copper ball and the chromium-plated disk specimen 2 may be measured.

[Friction Test 1]

First, in Friction Test 1, an average friction coefficient was measured by reciprocating the pin specimen 4 and the disk specimen 2 at an amplitude of ±0.2 mm, a frequency of 1.5 Hz, 20N, and 30° C. In Friction Test 1, a friction coefficient of lubricants for shock absorbers obtained by adding various friction adjusting agents such as phosphorus-based, amine-based, and ester-based ones and further adding 1% ZnDTP or no ZnDTP was measured. FIG. 2 shows the friction coefficient of ZnDTP-free lubricants for shock absorbers and FIG. 3 shows the friction coefficient of ZnDTP-containing lubricants for shock absorbers. When the friction coefficient of the lubricant for shock absorbers is too small, the operational stability is worse and when it is too large, the ride comfort is worse. It is therefore preferred to adjust the friction coefficient to fall in a range of 0.02 to 0.05. The friction coefficient has conventionally been adjusted by adjusting the amount of a friction adjusting agent added, but when a ZnDTP was not added as shown in FIG. 2, it was difficult to adjust the friction coefficient only by the friction adjusting agent. When a ZnDTP was added as shown in FIG. 3, on the other hand, it became easier to adjust the friction coefficient depending on the amount of the friction adjusting agent added and the friction coefficient was adjusted to fall in an intended range of 0.02 to 0.05.

Thus, in the lubricant for shock absorbers according to the present invention containing the ZnDTP in the friction adjusting agent thereof, the friction coefficient of the lubricant for shock absorbers can be adjusted to the range of 0.02 to 0.05 that satisfies both operational stability and ride comfort. This makes it possible to satisfy both operational stability and ride comfort.

[Friction Test 2]

Next, in Friction Test 2, the pin specimen 4 and the disk specimen 2 were reciprocated at an amplitude of ±0.1 mm, a frequency of 5 Hz, 20N, and 30° C. In Friction Test 2, as shown in FIG. 4, the friction coefficient of the lubricant for shock absorbers of Example 1 according to the present invention (that is, the lubricant for shock absorbers containing a ZnDTP having a primary alkyl group and a secondary alkyl group) and also that of Comparative Examples 1 to 4 were measured. Comparative Example 1 is an example of a lubricant for shock absorbers containing a ZnDTP having only primary alkyl groups with 3 and 5 carbon atoms; Comparative Example 2 is an example of a lubricant for shock absorbers containing a ZnDTP having only secondary alkyl groups with 3 and 5 carbon atoms; Comparative Example 3 is an example of a lubricant for shock absorbers containing a ZnDTP having only secondary alkyl groups with 6 and 8 carbon atoms; Comparative Example 4 is an example of a lubricant for shock absorbers containing a ZnDTP having only a primary alkyl group with 8 carbon atoms; and Comparative Example 5 is an example of a lubricant for shock absorbers containing a 1:1 mixture of a ZnDTP having only secondary alkyl groups with 3 and 6 carbon atoms and a ZnDTP having only a primary alkyl group with 8 carbon atoms.

In addition, in Friction Test 2, the maximum friction coefficient and average friction coefficient of the lubricants obtained in Example 1 and Comparative Examples 1 to 5 were measured while varying the amount (wt %) of the ZnDTP added. Further, a (maximum friction coefficient)/(average friction coefficient) ratio was calculated and the (maximum friction coefficient)/(average friction coefficient) ratio thus calculated was plotted for each of the amounts (wt %) of the ZnDTP added.

FIG. 4 shows the results of Friction Test 2. The lubricant with a (maximum friction coefficient)/(average friction coefficient) ratio close to 1 has less variation in the friction coefficient so that it is evaluated to provide good ride comfort. The results shown in FIG. 4 have revealed that when the amount of the ZnDTP added was 1.0 wt % or less in Comparative Examples 1 to 5, the (maximum friction coefficient)/(average friction coefficient) ratio was significantly higher than that of Example 1 and also when the amount of the ZnDTP added was 1.0 wt % or more, the (maximum friction coefficient)/(average friction coefficient) ratio was higher than that of Example 1. On the other hand, the overall (maximum friction coefficient)/(average friction coefficient) ratio tended to become lower in Example 1 than in Comparative Examples 1 to 5. In particular, when the amount of the ZnDTP added was 0.5 to 1.0 wt %, the (maximum friction coefficient)/(average friction coefficient) ratio was significantly lower than that in Comparative Examples 1 to 5.

Further, in Example 1, when the amount of the ZnDTP added was 0.1 to 4.0 wt %, the (maximum friction coefficient)/(average friction coefficient) ratio was 1.3 or less, while when it was 0.25 to 2.0 wt %, the (maximum friction coefficient)/(average friction coefficient) ratio was 1.22 or less. This has revealed that the lubricant for shock absorbers of the present invention containing the ZnDTP having a primary alkyl group and a secondary alkyl group provided improved ride comfort by adjusting the amount of the ZnDTP added to 0.25 to 2.0 wt %.

In addition, Friction 2 has revealed that the (maximum friction coefficient)/(average friction coefficient) ratio is more likely to vary according to a change in the amount of ZnDTP added in Comparative Examples 1 to 5 than in Example 1, while the (maximum friction coefficient)/(average friction coefficient) ratio does not vary so easily in Example 1 even if the amount of ZnDTP added changes. For example, in Example 1, when the amount of ZnDTP added was in a range of 0.2 to 4.0 wt %, the (maximum friction coefficient)/(average friction coefficient) ratio remained at 1.24 or less. This has revealed that the lubricant for shock absorbers containing the ZnDTP having a primary alkyl group and a secondary alkyl group according to the present invention is more effective for preventing a change in ride comfort than that of Comparative Examples 1 to 5 even when the ZnDTP has deteriorated (decomposed) and a content of the ZnDTP has decreased with long-term use.

In order to find whether a lubricant for shock absorbers capable of providing improved ride comfort should be a lubricant for shock absorbers containing a ZnDTP (first ZnDTP) having both a primary alkyl group and a secondary alkyl group, like the lubricant for shock absorbers according to the present invention (Example 1) or it may be a lubricant for shock absorbers containing a mixture of a ZnDTP having a primary alkyl group and a ZnDTP having a secondary alkyl group, a friction test was made using, as Comparative Example 4, a lubricant for shock absorbers containing a mixture of a ZnDTP having a primary alkyl group and a ZnDTP having a secondary alkyl group. As a result, the (maximum friction coefficient)/(average friction coefficient) ratio of the lubricant obtained in Comparative Example 4 did not lower as in Example 1 and ride comfort was not improved. This has suggested that the lubricant for shock absorbers containing a simple mixture of a ZnDTP having a primary alkyl group and a ZnDTP having a secondary alkyl group does not have such an effect of a lubricant for shock absorbers containing a ZnDTP (first ZnDTP) having both a primary alkyl group and a secondary alkyl group as provided by the lubricant for shock absorbers according to the present invention (Example 1).

As shown above, the lubricant for shock absorbers according to the present invention has the base oil (A) and the friction adjusting agent (B) and this friction adjusting agent (B) contains the first ZnDTP (C) having the primary alkyl group and the secondary alkyl group. The friction adjusting agent contained in the lubricant makes it possible to easily adjust the friction coefficient to be suited for good ride comfort and operational stability. In addition, compared with a lubricant for shock absorbers containing a ZnDTP having only a primary alkyl group and/or a ZnDTP having only a secondary alkyl group, variation in friction coefficient can be suppressed and ride comfort can be improved further.

In addition, when the lubricant for shock absorbers according to the present invention contains, as the dithiophosphate (C), a second ZnDTP having only a secondary alkyl group, it provides more improved ride comfort than a lubricant containing only the first ZnDTP. More specifically, the resulting lubricant can reduce the microvibration during running compared with the lubricant containing only the first ZnDTP. Further, by using, as the second ZnDTP, a ZnDTP having a secondary alkyl group with 3 to 8 carbon atoms, a difference in friction coefficient between a minute amplitude (low speed) and a normal amplitude (high speed) can be reduced, leading to improved ride comfort.

Preferred embodiment examples of the present invention have been described above, but the technical scope of the present invention is not limited by the description of the above embodiment. Various modifications or improvements may be added to the above embodiment examples and the embodiments obtained as a result of such modifications or improvements are also embraced in the technical scope of the present invention.

For example, the aforesaid lubricant for shock absorbers may have a constitution further containing a pentaerythritol. The pentaerythritol in the present invention is preferably used in the form of an ester. The pentaerythritol includes a pentaerythritol tetraester in which all four terminal substituents are ester bonded to a fatty acid residue and partial esters, that is, pentaerythritol monoester, pentaerythritol diester, and pentaerythritol triester in which any of terminal substituents are ester bonded to a fatty acid residue. In the present invention, any pentaerythritol is used without particular limitation. FIG. 5 is a graph showing the relation between the friction coefficient of a ZnDTP-containing lubricant for shock absorbers and an amount of the pentaerythritol added. As shown in FIG. 5, when the amount of the pentaerythritol is 0.2 wt % or more, the friction coefficient of the ZnDTP-containing lubricant for shock absorbers does not vary and it is in a range of 0.02 to 0.05. Thus, the addition of the pentaerythritol in an amount of 0.2 wt % or more does not affect the friction coefficient of the lubricant for shock absorbers so that it is preferred to add the pentaerythritol in an amount of 0.2 wt % or more, more preferably 1 wt % or more in view of the age-related deterioration (decomposition) of the pentaerythritol. The lubricant may also have a constitution containing the pentaerythritol in an amount of 3 wt % or more or 5 wt % or more.

As the number of carbon atoms of the fatty acid residue of the pentaerythritol ester is larger, the friction coefficient of the resulting lubricant for shock absorbers tends to be smaller, while as the number of carbon atoms of the fatty acid residue is smaller, the friction coefficient of the resulting lubricant for shock absorbers tends to be larger. In order to obtain a lubricant for shock absorbers having a desired friction coefficient, it is therefore possible to select an appropriate pentaerythritol, paying attention to the number of carbon atoms of the fatty acid residue which the pentaerythritol ester has. It is also possible to adjust the friction coefficient of a lubricant for shock absorbers by using, in combination, a plurality of pentaerythritol esters having fatty acid residues different in the number of carbon atoms. For example, the friction coefficient of a lubricant for shock absorbers can be adjusted by adjusting the mixing amount of a pentaerythritol ester having a fatty acid residue with the small number of carbon atoms and a pentaerythritol tetraester having a fatty acid residue with the large number of carbon atoms.

The fatty acid residue is not particularly limited and examples include $C_6$ to $C_{22}$ fatty acid residues such as stearic acid residue and oleic acid residue. As examples of the fatty acid residue, caprylic acid, capric acid, oleic acid, stearic acid, myristic acid, palmitic acid, linoleic acid, adipic acid, pelargonic acid, tall oil fatty acid, palm fatty acid, coconut fatty acid, and beef tallow fatty acid can be given.

The pentaerythritol ester may be composed mainly of a pentaerythritol tetraester. Described specifically, it may contain pentaerythritol monoester, diester, triester, and tetraester in which the tetraester is the most abundant or the tetraester content is 50% or more.

The invention claimed is:

1. A shock absorber including a lubricant composition, the lubricant composition comprising a base oil and a friction adjusting agent, wherein the friction adjusting agent contains a first zinc dithiophosphate represented by the following formula 1 and a second zinc dithiophosphate represented by the following formula 2:

[Chemical formula 1]

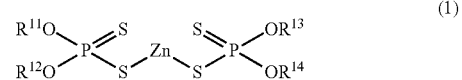
(1)

[in the formula 1, $R^{11}$ to $R^{14}$ are alkyl groups in which one or more and three or less is/are a primary alkyl group and the other(s) is/are a secondary alkyl group],

[Chemical formula 2]

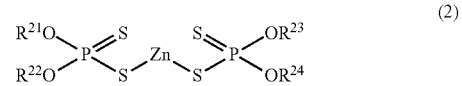
(2)

[in the formula 2, $R^{21}$ to $R^{24}$ are each a secondary alkyl group];

wherein the primary alkyl group which the first zinc dithiophosphate has is an alkyl group having 4 to 12 carbon atoms;

the secondary alkyl group which the first zinc dithiophosphate has is an alkyl group having 3 to 6 carbon atoms;

the first zinc dithiophosphate is contained in an amount of 0.25 mass % or more and 2 mass % or less in the lubricant composition; and the secondary alkyl group which the second zinc dithiophosphate has is an alkyl group having 3 to 8 carbon atoms.

2. A lubricant composition, comprising a first zinc dithiophosphate represented by the following formula 1 and a second zinc dithiophosphate represented by the following formula 2:

[Chemical formula 1]

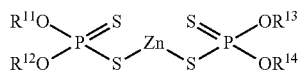
(1)

[in the formula 1, $R^{11}$ to $R^{14}$ are alkyl groups in which one or more and three or less is/are a primary alkyl group and the other(s) is/are a secondary alkyl group],

[Chemical formula 2]

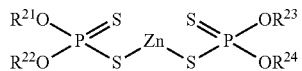
(2)

[in the formula 2, $R^{21}$ to $R^{24}$ are each a secondary alkyl group];
wherein the primary alkyl group which the first zinc dithiophosphate has is an alkyl group having 4 to 12 carbon atoms;
the secondary alkyl group which the first zinc dithiophosphate has is an alkyl group having 3 to 6 carbon atoms;
the first zinc dithiophosphate is contained in an amount of 0.25 mass % or more and 2 mass % or less in the lubricant composition; and
the secondary alkyl group which the second zinc dithiophosphate has is an alkyl group having 3 to 8 carbon atoms.

3. The shock absorber according to claim 1, the lubricant composition further comprising pentaerythritol esters and/or pentaerythritol derivatives as the friction adjusting agent, wherein the pentaerythritol esters and/or pentaerythritol derivatives are contained in 2 wt. % or more based of a total composition.

4. The shock absorber according to claim 1, wherein a ratio of the primary alkyl group is higher than a ratio of the secondary alkyl group in the first zinc dithiophosphate.

5. A shock absorber including a lubricant composition, the lubricant composition comprising a base oil and a friction adjusting agent, wherein the friction adjusting agent contains a first zinc dithiophosphate represented by the following formula 1 and a second zinc dithiophosphate represented by the following formula 2:

[Chemical formula 1]

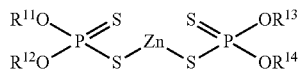
(1)

[in the formula 1, $R^{11}$ to $R^{14}$ are alkyl groups in which one or more and three or less is/are a primary alkyl group and the other(s) is/are a secondary alkyl group],

[Chemical formula 2]

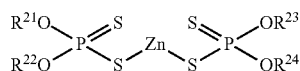
(2)

[in the formula 2, $R^{21}$ to $R^{24}$ are each a secondary alkyl group];
wherein the content of the second zinc dithiophosphate is smaller than the content of the first zinc dithiophosphate.

6. The lubricant composition for shock absorbers according to claim 5, which contains the first zinc dithiophosphate in an amount of 0.1 wt. % or more and 4.0 wt. % or less in the lubricating composition.

7. The lubricant composition for shock absorbers according to claim 5, which contains the first zinc dithiophosphate in an amount of 0.25 mass % or more and 2 mass % or less in the lubricating composition.

8. The shock absorber according to claim 5, the lubricant composition further comprising pentaerythritol esters and/or pentaerythritol derivatives as the friction adjusting agent, wherein the pentaerythritol esters and/or pentaerythritol derivatives are contained in 2 wt. % or more based of a total composition.

9. The shock absorber according to claim 5, wherein a ratio of the primary alkyl group is higher than a ratio of the secondary alkyl group in the first zinc dithiophosphate.

10. A lubricant composition, comprising a first zinc dithiophosphate represented by the following formula 1 and a second zinc dithiophosphate represented by the following formula 2:

[Chemical formula 1]

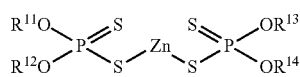
(1)

[in the formula 1, $R^{11}$ to $R^{14}$ are alkyl groups in which one or more and three or less is/are a primary alkyl group and the other(s) is/are a secondary alkyl group],

[Chemical formula 2]

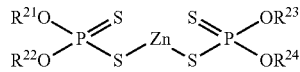
(2)

[in the formula 2, $R^{21}$ to $R^{24}$ are each a secondary alkyl group];
wherein the content of the second zinc dithiophosphate is smaller than the content of the first zinc dithiophosphate.

* * * * *